United States Patent
Zibuschka et al.

(10) Patent No.: US 10,715,348 B2
(45) Date of Patent: Jul. 14, 2020

(54) METHOD FOR PROCESSING USER INFORMATION DETECTED BY AT LEAST ONE DETECTION DEVICE OF A SYSTEM

(71) Applicant: Robert Bosch GmbH, Stuttgart (DE)

(72) Inventors: Jan Zibuschka, Magstadt (DE); Oliver Rogalla, Vaihingen (DE)

(73) Assignee: Robert Bosch Gmbh, Stuttgart (DE)

( * ) Notice: Subject to any disclaimer, the term of this patent is extended or adjusted under 35 U.S.C. 154(b) by 453 days.

(21) Appl. No.: 15/791,112

(22) Filed: Oct. 23, 2017

(65) Prior Publication Data

US 2018/0123822 A1    May 3, 2018

(30) Foreign Application Priority Data

Oct. 31, 2016   (DE) .................. 10 2016 221 377

(51) Int. Cl.
| | |
|---|---|
| *H04L 29/08* | (2006.01) |
| *H04L 12/28* | (2006.01) |
| *H04L 12/46* | (2006.01) |
| *H04L 29/06* | (2006.01) |
| *G05B 15/02* | (2006.01) |
| *G06F 21/32* | (2013.01) |
| *G06F 21/62* | (2013.01) |
| *H04N 5/232* | (2006.01) |

(52) U.S. Cl.
CPC .......... *H04L 12/2829* (2013.01); *G05B 15/02* (2013.01); *G06F 21/32* (2013.01); *G06F 21/6218* (2013.01); *H04L 12/282* (2013.01); *H04L 12/4625* (2013.01); *H04L 63/0861* (2013.01); *H04L 63/102* (2013.01); *H04L 67/22* (2013.01); *H04L 67/306* (2013.01); *H04N 5/232* (2013.01)

(58) Field of Classification Search
CPC .......... G06K 9/00771; G06K 9/00248; G06K 9/00711; G06T 2207/30196; H04L 2209/60; H04L 67/306; H04N 2201/218; H04N 2201/3295; H04W 12/02; G08B 13/19645; G08B 13/19686
See application file for complete search history.

(56) References Cited

U.S. PATENT DOCUMENTS

| | | | |
|---|---|---|---|
| 8,558,696 B2 | 10/2013 | Baumann et al. | |
| 2005/0140785 A1* | 6/2005 | Mazzilli | B60R 1/12 348/148 |
| 2011/0202968 A1* | 8/2011 | Nurmi | G06F 21/10 726/1 |
| 2016/0104035 A1* | 4/2016 | Wang | G06K 9/00771 382/118 |

\* cited by examiner

*Primary Examiner* — Brian F Shaw
(74) *Attorney, Agent, or Firm* — Norton Rose Fulbright US LLP; Gerard Messina

(57) ABSTRACT

A method for processing user information detected by at least one detection device of a device, in which information concerning at least one user detected by the at least one detection device is transmitted to a number of databases, and in which the information detected by the at least one detection device is at least partially associated with a user profile, and in which all information stored on the number of databases which has been detected by the at least one detection device and associated with the user profile is retrieved from the number of databases, and as a function of a result of an authentication of the user is output to the user on at least one output unit for processing.

13 Claims, 2 Drawing Sheets

METHOD FOR PROCESSING USER INFORMATION DETECTED BY AT LEAST ONE DETECTION DEVICE OF A SYSTEM

CROSS REFERENCE

The present application claims the benefit under 35 U.S.C. § 119 of German Patent Application No. DE 102016221377.6 filed on Oct. 31, 2016, which is expressly incorporated herein by reference in its entirety.

FIELD

The present invention relates to a method for processing user information detected by at least one detection device of a system, and a device that is configured for carrying out the presented method.

BACKGROUND INFORMATION

Information concerning various users situated in the range of a sensor system of such a system is continuously detected by devices, such as a game console equipped with an optical sensor or a mobile telephone that includes a digital assistant, which, when activated, continuously monitor a user and his/her surroundings. However, there is only limited capability for a user situated in the range of a sensor system of this type of system to process, i.e., view and/or edit, the information detected by such systems.

Methods exist in which, for example, handling of information that is collected by a smart phone may be controlled by a user. However, only selected information packets are provided to the user for management. In addition, also for the case that a display unit used has been provided with a powerful authentication means such as a fingerprint scanner, such methods generally are protected only via a password request.

U.S. Pat. No. 8,558,696 B2 describes a monitoring system for detecting a moving object with the aid of a plurality of sensors, in which data of the object detected by the plurality of sensors are compared to a signature associated with the object.

SUMMARY

Specific embodiments of the present invention are described herein and are shown in the figures.

A typical problem of monitoring devices, as frequently used for controlling devices in the so-called "Internet of Things," is that such monitoring devices often detect personal information about persons which is capable of violating the privacy of the persons. To allow a user to control information that is collected about him/her, in one embodiment of the presented method it is provided that user information that is detected by a detection device of a monitoring device, i.e., information that has been collected about a user, is transmitted to a number of databases, and the user information and/or data linked to the detected user information is/are queried as a function of a result of an authentication of a user of the databases, and is/are output on at least one output unit for processing. The processing takes place by the user, for example for editing the data linked to the user profile of the user, in particular directly on the databases of the monitoring system. Due to the processing of the user data directly on the databases of the monitoring system, the user is provided with an option for protecting his/her privacy with respect to the monitoring system, with the aid of which the user may monitor and optionally delete his/her user data.

In the context of the present patent application, the phrase "output for processing" is understood to mean an operation in which data are represented on an output unit, for example a screen or a speaker, or provided to a user for processing or editing.

To associate particular information, detected by a detection device, with a user, and to allow the user to view and/or edit the information, it is provided that information detected by the detection device concerning a person situated in a detection range of the detection device is associated with a user profile. Due to this association of information with a user profile, a user may search for and retrieve or jointly edit, i.e., delete, for example, his/her information, i.e., that information which is associated with his/her user profile, also on a plurality of databases, regardless of a storage location.

In addition, information that is assigned to a user profile may be provided with access rules, so that processing, i.e., representation and/or editing of information assigned to a user profile, is linked by a user to certain criteria that, for example, are predefined by the user.

To prevent access, i.e., representation and/or editing of information assigned to a user profile, to an assignment of the user by unauthorized persons, it is provided that for accessing, i.e., for representing and/or editing particular information assigned to a user profile of the user, a person who provides appropriate control commands must be or become authenticated. Methods that utilize a detection device itself, for example a camera and/or a microphone, are particularly suited for authenticating the person. Thus, for example, biometric data of the person may be detected and compared to stored data. A fingerprint scanner has proven to be particularly advantageous for authenticating a person.

Since a plurality of users is generally detected by a monitoring device or a detection device, such as a camera or a microphone, included by a monitoring device, which may detect a plurality of persons, it is provided in particular that only that information which has been detected within a time period in which the user was registered as active by the system is output to the user and/or is to be processed by the user. By limiting access of a user to that information which was detected, for example by a detection device, within a time period in which the user was active, information concerning additional users or persons who were detected, for example, within a time period in which the user was not active, is protected from access by the user and the user's privacy is maintained. A registration of the user as active may also take place when there is no interaction of the user with the system, in that the user is recognized by the system as active, for example, by a recognition of biometric functions with the aid of a camera.

Herein, an assignment of information to a user profile is understood to mean an operation in which information that is detected by a detection device is provided with a profile identifier or stored at a storage location that is associated with a user who has been identified by the detection device based, for example, on facial recognition or voice recognition.

The presented method allows a person to control, while the person is present, detected data of the person and, for example, to protect against access by unknown persons with the aid of an authorization request made prior to access to the data.

To protect the privacy of a user and prevent unknown persons from obtaining information recorded by a detection device, it may be provided that the information concerning the user, detected by the detection device, is at least partially removed from an output as a function of at least one criterion provided by the user. For example, the user may activate a private mode in which information instantaneously recorded by the detection device is not stored, or is released only for processing, i.e., for viewing and/or editing by the user. Of course, such a private mode may be activated instantaneously or at a later point in time. It may be provided that a representation of information that is associated with a private mode is automatically masked or muted or excluded from any other conceivable playback when a monitoring system has recognized a person who does not correspond to the user, or to a person from a list of persons predefined by the user.

To remove certain information from a representation for specific, i.e., unknown, persons, a criterion may be provided that is predefined by a user. Such a criterion may be, for example, that information to be removed from the output has been detected within a predefined time period, for example after the close of business. Other criteria may be, for example, that a particular recognized person has not already been recognized at an earlier point in time by a monitoring system in question, or that the recognized person is to be associated with a person on a list of predefined persons.

Of course, it may also be provided that information detected during an activated private mode is excluded as a function of a control command to be predefined by a user, such as activating a certain button of an output on an output unit, for example a screen, so that only information that was not detected during the activated private mode is output.

It is possible that the information to be output to the user for processing may include information that is associated with the information concerning the user. To achieve comprehensive control of information concerning a user detected by a monitoring system, it may be provided that information which is to be represented and/or edited by the presented method is also information associated with the particular information concerning a user detected by a monitoring system, i.e., which is connected, for example via a link, to the information detected by the monitoring system about the user or from the user. A linkage of information to information detected by a user may result, for example, due to a spatial proximity of a detection system to a detection device that is used for detecting the information concerning the user.

In order to completely control the information that is detected from a user or collected about a user by a monitoring device, it is provided that particular information associated with a user profile of the user is processed in a joint process on all databases to which particular information associated with a user profile of the user has been transmitted by the monitoring device. For this purpose, for example a transmission history of the monitoring device may be evaluated.

Moreover, the present invention relates to a device for processing user data, including at least one detection device for detecting user information, and a processing unit, the processing unit being configured for associating with a user profile, at least in part, information concerning a user detected by the at least one detection device and storing it on a number of databases, and the processing unit also being configured for retrieving for the user, from the number of databases, all information stored on the number of databases which has been detected by the at least one detection device and associated with the user profile, and outputting it to at least one output unit as a function of a result of an authentication of the user.

The presented device is used in particular for carrying out the presented method.

Any technical device that is suitable for detecting information may be used as a detection device of the presented device. In particular, a detection device may include a camera and/or a microphone.

An example of carrying out one possible embodiment of the presented method, together with one possible embodiment of the presented device, is described below based on an example.

Alice visits her friend Bob, who has recently installed a so-called intelligent smart home system in his residence. When Alice rings at the door, a detection device in the form of a camera attempts to recognize Alice and identify her. Since Alice is visiting Bob for the first time, the detection device does not find a profile associated with Alice or with her facial pattern, so that the intelligent smart home system creates a new user profile for Alice, and thus begins to associate information detected from Alice with her profile, for example in order to provide information collected about Alice with a reference to her user profile. Later in the evening, Bob switches the intelligent smart home system into a private mode so that the system does not interfere with the interaction of Bob and Alice. Since, while the private mode is activated, no information is transmitted to databases linked to the intelligent smart home system by, for example, applications that interact with the intelligent smart home system, no information or only a reduced quantity of information is transmitted to the databases. Similarly, no information or only a reduced quantity of information is linked to the profiles of Bob and Alice. When Alice leaves Bob's residence later in the evening, the detection device detects Alice at the door and recognizes her. The intelligent smart home system now no longer links the information detected by the detection device with Alice's user profile. If Alice later returns, via a screen at Bob's residence she is able to request or output information that was collected about her during her first visit, but not information that was collected between Alice's first visit and the return visit.

Further advantages and embodiments of the present invention result from the description herein and the figures.

It is understood that the features described above and explained below may be used not only in the particular stated combination, but also in other combinations or alone without departing from the scope of the present invention.

DETAILED DESCRIPTION OF EXAMPLE EMBODIMENTS

Figure 1:
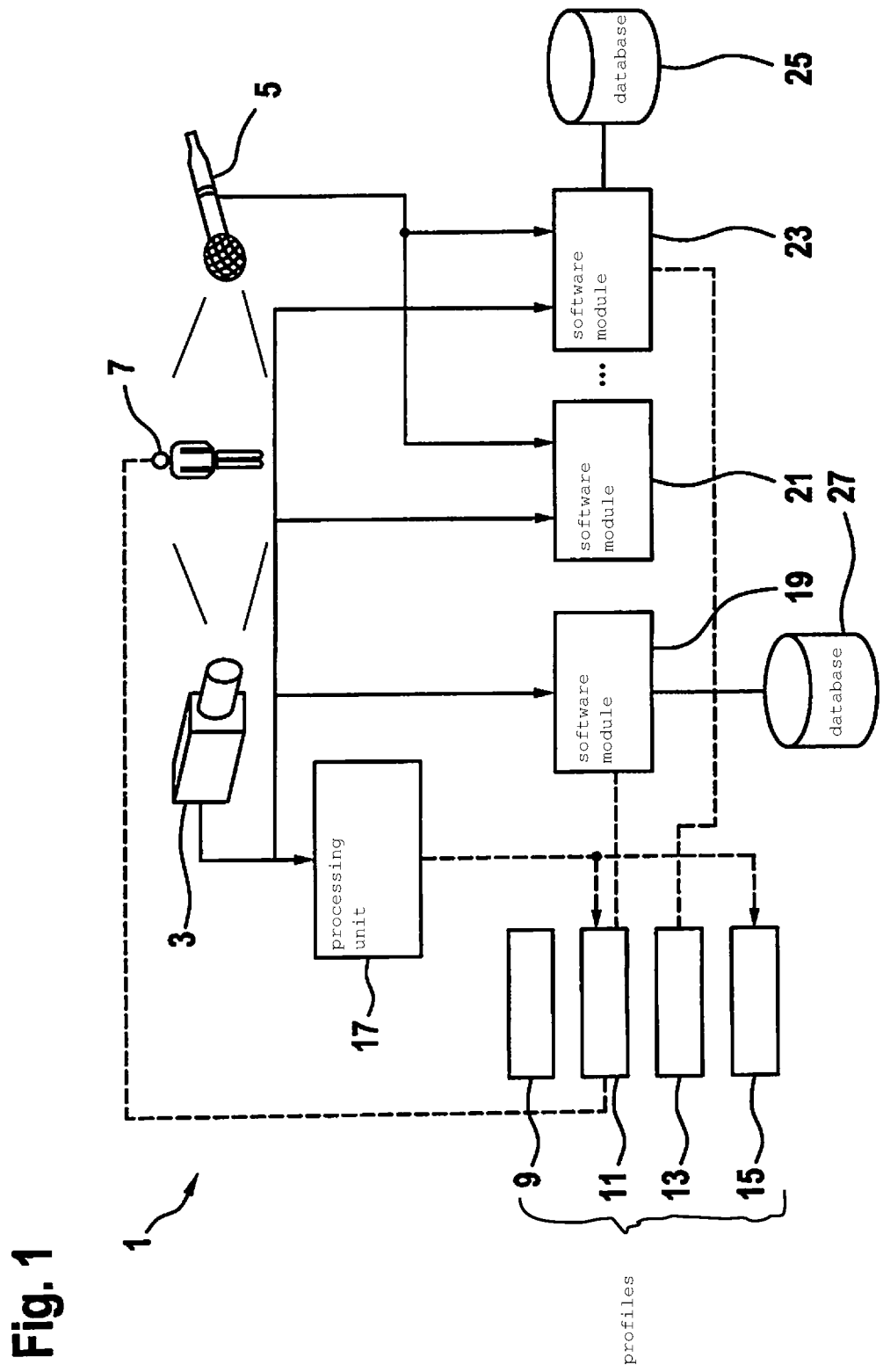
FIG. 1 shows a schematic illustration of one possible embodiment of the presented device.

The figures are described in an interrelated and all-encompassing manner, with identical features being denoted by the same reference numerals.

FIG. 1 illustrates a monitoring device 1 which includes detection devices in the form of a camera 3 and a microphone 5, and which detects data from a number of users.

For carrying out the present method, it is provided that data detected from the number of users by camera 3 and microphone 5 are associated with corresponding profiles 9, 11, 13, or 15 and stored on a database 27. In order to associate the data of a particular user 7 detected by camera 3 and microphone 5 with his/her user profile 11, camera 3 and microphone 5 are connected to a processing unit 17 which executes a program that recognizes user 7 based, for example, on biometric properties of user 7.

Similarly, with the aid of the program that is executed on processing unit 17, it may be recognized whether user 7 is already known to monitoring device 1, i.e., whether a user profile for user 7 already exists or whether, for example, a new user profile is to be created. For recognizing user 7, for example a comparison with data of user 7 detected at an earlier point in time may take place, for example based on a so-called "fuzzy extractor." Of course, a recognition of user 7 may also take place based on an electronic device of user 7, such as his/her smart phone.

In addition to the program executed on processing unit 17, software modules 19, 21, and 23 are provided which query the information from camera 3 and microphone 5, optionally process it, and store it in at least one database 25. Of particular importance is software module 23, which manages information that has already been detected from user 7 with the aid of camera 3 and/or microphone 5 while user 7 was active, i.e., was within a recording range of monitoring system 1 and in an "available" state, for example. For this purpose, that data associated with user 7, for example recorded by the user, is linked to a user parameter that allows an assignment of the data to user profile 11 of user 7. The data assigned to user profile 11 are subsequently stored on a database 25 associated with software module 23, together with a date that indicates a time of the recording, for example.

It is possible for the "available" state to be changeable by user 7 into a "private" state, for example, with the aid of an input unit, for example, so that software module 23 does not store information about user 7 instantaneously collected by camera 3 and/or microphone 5, and does not associate the information with user profile 11. It may be provided that only those software modules 19, 21, or 23 that have not been switched into a "private" mode, or that are not affected by activating the "private" state and operate independently of a state of the user, detect information concerning user 7.

Of course, it is also possible that user 7 may completely edit and, for example, delete his/her user profile 11. For this purpose, user 7 may connect to monitoring device 1 with the aid of his/her smart phone, for example, and after an authentication, for example via a fingerprint scanner of the smart phone, delete his/her user profile 11.

To allow user 7 to have comprehensive control of data detected by monitoring device 1, it may also be provided that software module 23 requests from a database 27 additional information that is managed by software modules 19 and 21, which are linked to his/her user profile 11, and presents it to user 7 for processing, i.e., for viewing and/or for editing, for example for changing or deleting. Such additional information may include, for example, information that has been detected by further detection devices, or other personal information which with a high probability is associated with user 7, for example due to a spatial proximity of a particular detection device to camera 3 and/or to microphone 5.

To avoid management of the information, collected about user 7, by unauthorized users, it is provided that user 7 must authenticate him/herself with the aid of a biometric scanner, for example, before user 7 is shown his/her information, i.e., information associated with his/her user profile 11, or is able to edit it.

Figure 2:
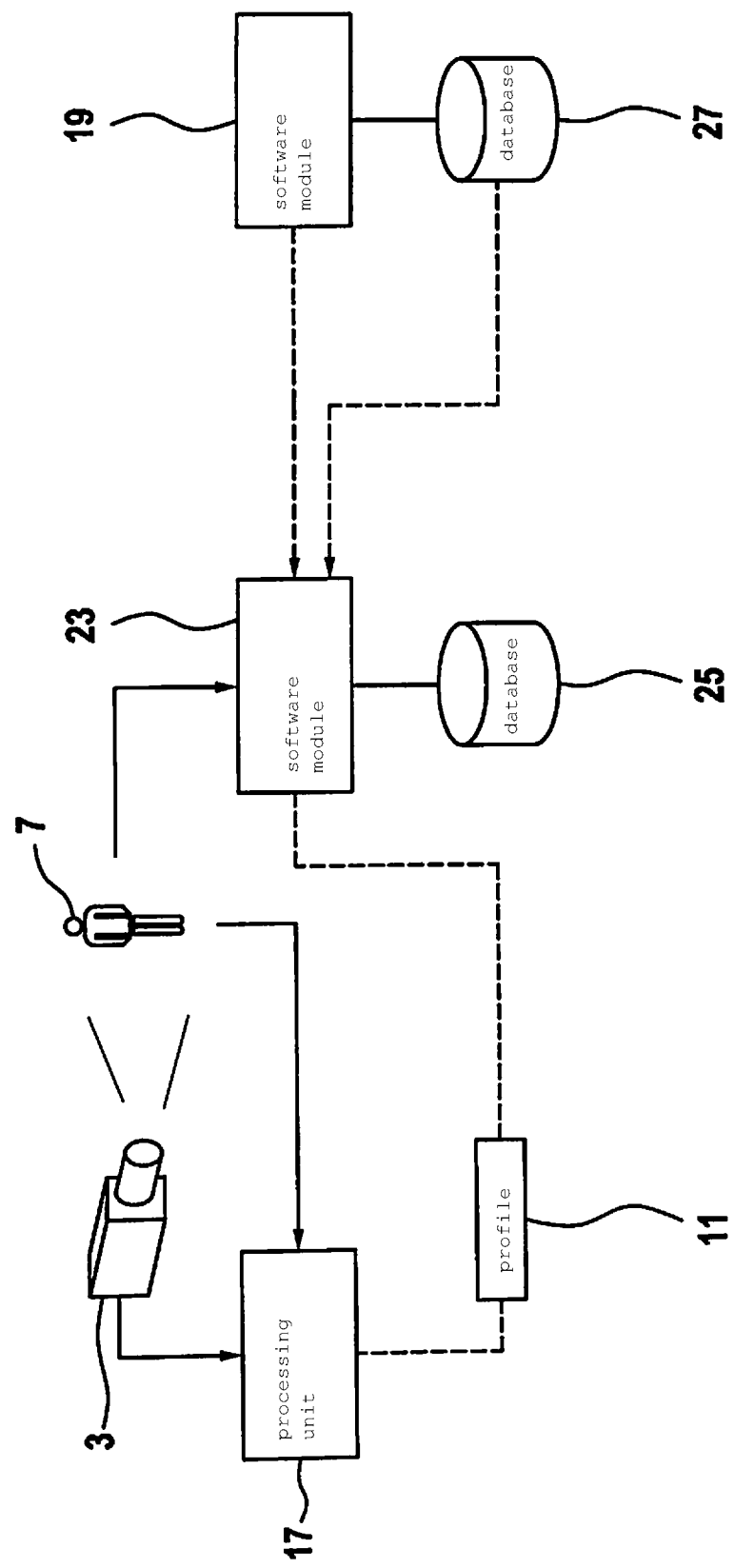
FIG. 2 shows a schematic illustration of one possible embodiment of the presented method.

FIG. 2 illustrates in greater detail management of information, ascertained by software module 23 from FIG. 1, by user 7.

For authenticating user 7, monitoring device 1 itself is used here, in which biometric features of user 7 are compared to stored features of user 7 with the aid of camera 5 and the program executed on processing unit 17. Of course, user 7 may also authenticate him/herself via a password or a security token or any other technically suitable security method.

As soon as user 7 has authenticated him/herself, software module 23 collects all information associated with user profile 11 of user 7 from database 25 and optionally from database 27 associated with software module 19, and represents the collected information to user 7 or on a display unit, for example, for processing.

What is claimed is:

1. A method for processing user information detected by at least one detection device of a device, the method comprising:
   transmitting information concerning at least one user detected by the at least one detection device to a number of databases;
   at least partially associating, in the number of databases, the information detected by the at least one detection device with a user profile;
   retrieving, from the number of databases, all the information detected by the at least one detection device and associated with the user profile; and
   outputting to the user, as a function of a result of an authenticiation of the user, the retrieved information on at least one output unit for processing;
   wherein information that is associated with the user profile of the user is detected and processed with a software module that accesses all software modules of the system which manage the information associated with the user profile.

2. The method of claim 1, wherein only that information which was detected within a time period in which the user was registered as active by the system is at least one of: (i) output to the user, and (ii) edited by the user.

3. The method of claim 1, wherein the user is authenticated with the aid of at least one detection of biometric data of the user.

4. The method of claim 1, wherein the information concerning the at least one user detected by the at least one detection device is at least partially removed from an output on the at least one output unit as a function of at least one criterion provided by the user.

5. The method of claim 4, wherein the at least one criterion provided by the user is selected from the following list of criteria or a combination thereof: (i) particular information to be removed from the output must have been detected within a predefined time period, (ii) the user who would like to view the particular information to be output must be associated with a list of user identifiers, or (iii) the user who would like to view the particular information to be output must have been at least one of detected within a predefined time period and authenticated by the system within a predefined time period.

6. The method of claim 1, wherein the particular information to be output is excluded from viewing by other persons as a function of a control command to be provided by the user.

7. The method of claim 2, wherein the information to be at least one of output and edited by the user includes information that is associated with the information concerning the user.

8. The method of claim 1, wherein the number of databases includes a plurality of independent databases.

9. The method of claim 1, wherein the information concerning the at least one user detected by the at least one detection device is deleted from the number of databases as a function of a command to be provided by the user.

10. A device for processing user data, comprising:
   at least one detection device for detecting user information; and
   a processing unit configured for associating with a user profile, at least in part, information concerning a user detected by the at least one detection device and storing the information concerning the user on a number of databases, the processing unit being configured for retrieving for the user, from the number of databases, all information stored on the number of databases which has been detected by the at least one detection device and associated with the user profile, and outputting it to at least one output unit as a function of a result of an authentication of the user;
   wherein information that is associated with the user profile of the user is detected and processed with a software module that accesses all software modules of the system which manage the information associated with the user profile.

11. The method of claim 10, wherein the processing unit is configured for retrieving from the number of databases all information stored on the number of databases which has been detected by the at least one detection device and associated with the user profile, and as a function of a result of an authentication of the user, outputting it to the user for editing the information on the number of databases on the at least one output unit.

12. The method of claim 10, wherein the device is a control system for a residential building and includes at least one of: (i) a camera sensor, and (ii) a microphone sensor.

13. The method of claim 10, wherein the device is a a control system for a vehicle and includes at least one of: (i) a camera sensor, and (ii) a microphone sensor.

* * * * *